(12) United States Patent
Rowe

(10) Patent No.: US 6,373,165 B1
(45) Date of Patent: Apr. 16, 2002

(54) APPARATUS AND METHOD FOR CLAMPING TURBINE GENERATOR COIL WINDINGS USING BOLTED CLAMP

(75) Inventor: Charles M. Rowe, Orlando, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 0 days.

(21) Appl. No.: 09/696,848

(22) Filed: Oct. 26, 2000

(51) Int. Cl.[7] ................................................. H02K 3/46
(52) U.S. Cl. ........................................... 310/260; 310/42
(58) Field of Search ................................. 310/260, 194, 310/270, 42

(56) References Cited

U.S. PATENT DOCUMENTS

| 1,401,697 A | 12/1921 | Henninger |
| 3,293,472 A | * 12/1966 | Stevens ....................... 310/260 |
| 3,610,977 A | 10/1971 | Dalmo et al. ................. 310/65 |
| 3,739,214 A | 6/1973 | Johansson ................... 310/260 |
| RE28,478 E | 7/1975 | Bahn et al. .................. 310/260 |
| 4,268,773 A | 5/1981 | Beck et al. .................. 310/269 |
| 4,333,027 A | 6/1982 | Madsen ........................ 310/61 |
| 4,371,799 A | 2/1983 | DeWolf et al. ............. 310/154 |
| 4,415,825 A | 11/1983 | Dailey et al. ............... 310/270 |
| 4,554,475 A | 11/1985 | Sisk ............................ 310/208 |
| 4,563,607 A | 1/1986 | Cooper et al. ............... 310/260 |
| 4,782,579 A | 11/1988 | Rowe et al. ................... 29/596 |
| 4,806,807 A | 2/1989 | Levino ......................... 310/71 |
| 4,942,326 A | 7/1990 | Butler, III et al. .......... 310/260 |
| 5,159,220 A | 10/1992 | Klima ......................... 310/156 |
| 5,373,211 A | 12/1994 | Ramirez-Coronel et al. ..... 310/260 |
| 5,734,220 A | 3/1998 | Rowe et al. ................. 310/260 |
| 5,798,595 A | 8/1998 | Nilsson et al. .............. 310/260 |
| 5,939,814 A | 8/1999 | Rowe et al. ................. 310/260 |
| 6,054,792 A | 4/2000 | Rowe et al. ................. 310/260 |

* cited by examiner

Primary Examiner—Burton S. Mullins

(57) ABSTRACT

A clamping apparatus clamps opposing pairs of stator coil windings of a turbine generator and includes a retaining platform positioned adjacent one side and across a pair of coil windings having a space therebetween. A bore extends therethrough and is aligned with the space between the pair of coil windings. A connecting insert member is carried within the bore of the retaining platform and has a threaded through-hole aligned with the space between the pair of coil windings. A threaded rod extends through the space between the pair of coil windings and through the threaded through-hole of the connecting insert member. The threaded rod mates with the threaded through-hole such that the tension created in the threaded rod during tightening biases the retaining platform against the pair of coil windings.

21 Claims, 3 Drawing Sheets

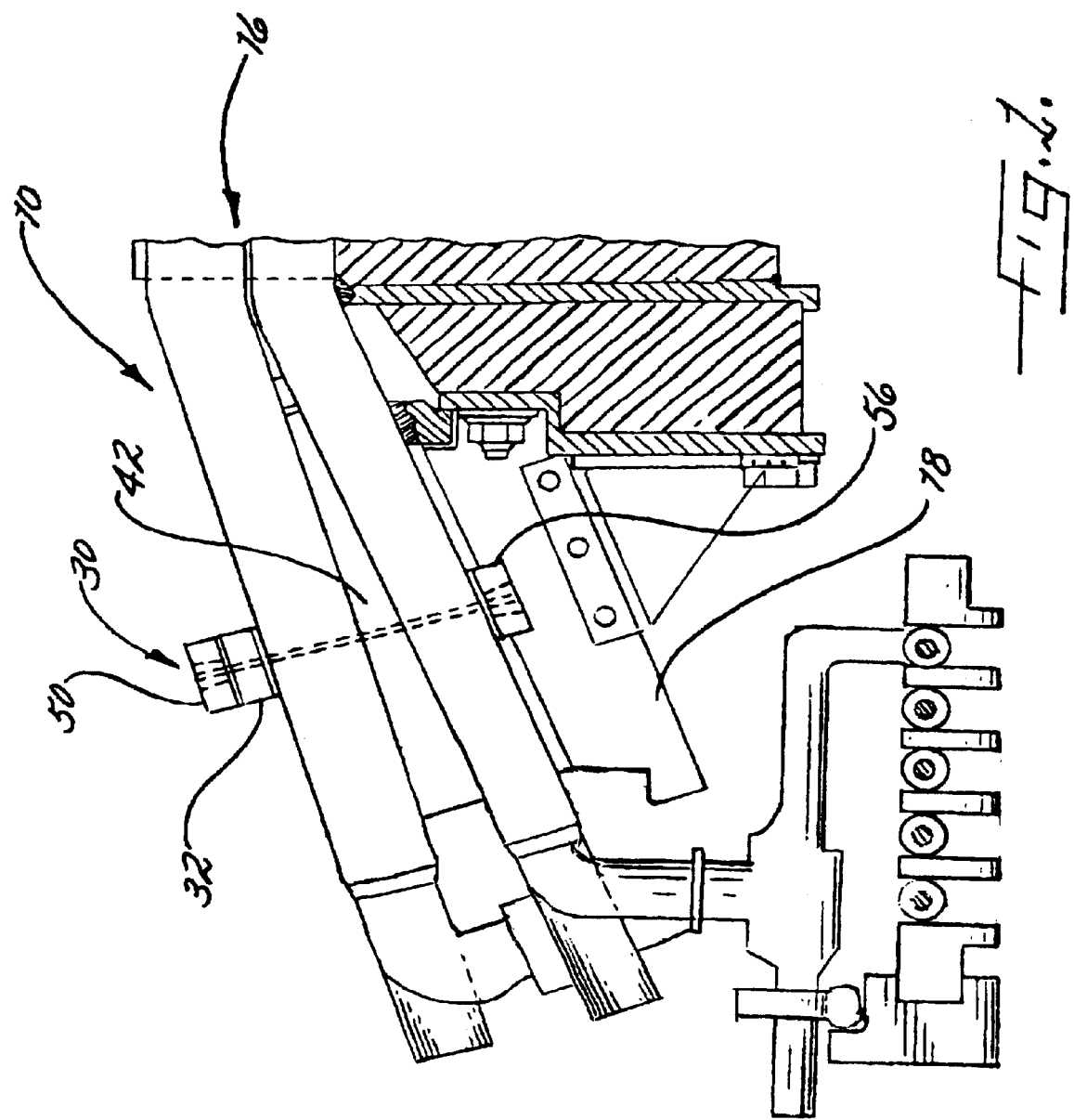

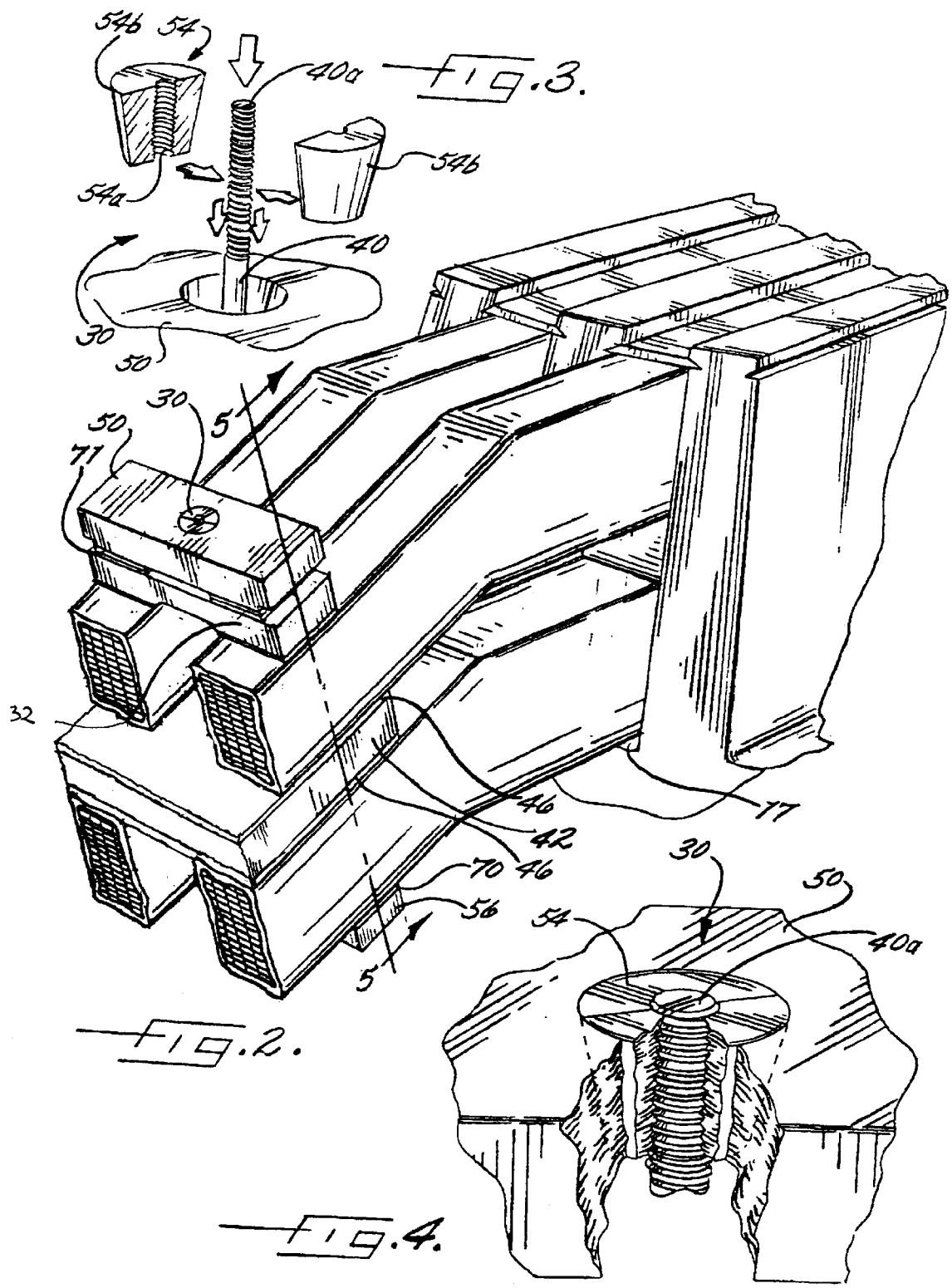

APPARATUS AND METHOD FOR CLAMPING TURBINE GENERATOR COIL WINDINGS USING BOLTED CLAMP

FIELD OF THE INVENTION

This invention relates to the field of turbine generators, and more particularly, this invention relates to a clamping apparatus and method for clamping of stator coil windings within a turbine generator.

BACKGROUND OF THE INVENTION

Turbine generators for producing electric power are well known and typically include an end winding portion that includes a stator core having several slots that receive and support conductors. The end windings may not be adequately supported within the core slots during operation of the generator and are often subject to severe vibrations and stresses, which may cause adverse structural deformations. Structural deformation may also arise from electromagnetic forces which occur during abnormal short-circuit or fault conditions.

Several techniques have been developed in an attempt to prevent the end windings from undergoing negative structural deformations, such as that disclosed in U.S. Pat. No. 4,563,607 to Cooper et al. for a radial clamp assembly for dynamoelectric machine stator coil end turns. Top and bottom coils disposed within slots stator iron core are supported with a radial clamp, braces, brackets, rings and stain blocks.

The radial clamp is typically positioned in the mid-involute region between the axial extreme of the end winding and the core.

The support blocks are located radially above and below a respective pair of end turns so that one support block bears against two parallel bottom coils and the other support block bears against two parallel top coils.

Upper and lower pins are disposed across the support block transverse to the orientation direction of the coils. A tensioned banding loop is disposed continuously around the pins on each side of the coils so that the banding loop bears against the pins which, in turn, bear against their adjacent support blocks and coils.

With the banding loop in position, the pins are rotated to twist the banding loop for taking in excess slack, thereby tightening the banding loop between the coils. Resin dispersed within the banding loop is then cured on site, typically by hot air flowing over the banding loop. The curing process requires additional time and expense to install. Typically, band curing extends work schedules and consequently adds to the overall cost of the turbine generator.

U.S. Pat. No. 6,054,792, assigned to the present assignee and hereby incorporated by reference in its entirety, provides a more economical means of installing and maintaining a turbine generator and reduces the number of components that must be accounted for during the installation of the radial clamps.

In the '792 disclosure, a clamping apparatus includes a retaining platform for extending across a pair of coil windings positioned in a spaced relation. The retaining platform has a bore extending therethrough. A connecting insert member is slidably carried within the bore of the retaining platform. The connecting insert member has a through-hole and means for admitting a rod into the through-hole. The rod passes through the through-hole of the connecting insert member and includes a bulbous shaped end dimensioned for passing through the bore of the retaining platform while the through-hole of the connecting insert member prevents passage of the bulbous shaped end therethrough. Thus, tension in the rod biases the platform against the coil windings.

In one preferred embodiment, the connecting insert member comprises separable mating segments as the means for admitting a rod into the through-hole. The through-hole of the connecting insert member includes a first dimension that permits passage of the bulbous end therein, and a second dimension that prevents passage of the bulbous end therethrough. In one embodiment, the connecting insert member has a tapered cross-section for slidably securing the member within the bore of the retaining platform.

Although the '792 patent discloses an advantageous mechanism for clamping turbine generator coil windings, it would be desirable if a clamp design were even quicker to install and allowed a more simple structure.

SUMMARY OF THE INVENTION

The present invention is advantageous and now provides a clamping apparatus useful for clamping opposing pairs of stator coil windings of a turbine generator in a quick and efficient manner. A retaining platform is positioned adjacent one side and across a pair of coil windings having a space therebetween and having a bore extending therethrough that is aligned with the space between the pair of coil windings. A connecting insert member is carried within the bore of the retaining platform and has a threaded through-hole aligned with the space between the pair of coil windings. A threaded rod extends through the space between the pair of coil windings and through the threaded through-hole of the connecting insert member. This threaded rod mates with the threaded through-hole such that the tension created in the threaded rod during tightening biases the retaining platform against the pair of coil windings.

In one aspect of the present invention, the threaded rod is used with shims for increasing or decreasing tension within the threaded rod and increasing or decreasing biasing of the retaining platform against the pair of coil windings. The threaded rod is preferably formed from a material wherein the compression of the threads is increased with increased tension. An example of such a material is resin treated fiberglass. The connecting insert member in one aspect of the invention has a tapered cross-section adjustably secured within the bore of the retaining platform.

In yet another aspect of the present invention, a support block is positioned between the retaining platform and across the pair of coil windings and has an aperture therethrough for aligning with the space between the pair of coil windings and the bore of the retaining platform. The connecting insert member includes separable mating segments that include mating arcuate portions forming the through-hole. The pair of coil windings are positioned parallel and in a spaced relation, thus having a space therebetween when tension is applied.

In yet another aspect of the present invention, a first retaining platform is positioned adjacent one side and across a first pair of coil windings having a space therebetween. This first retaining platform has a bore extending therethrough that is aligned with the space between the first pair of coil windings. A second retaining platform is positioned adjacent one side and across a second pair of coil windings having a space therebetween. The second retaining platform has a bore extending therethrough for aligning with the space of the second pair of coil windings. The first and second pair of coil windings are sandwiched between first and second retaining platforms.

First and second connecting insert members are each respectively carried within each bore of the retaining platform and each of the connecting insert portions has a threaded through-hole. A threaded rod passes through each of the spaces of the first and second pairs of coil windings and passes through the through-holes of the connecting insert members. The threaded rod mates with each threaded through-hole such that tension in the threaded rod biases the retaining platform against the pairs of coil windings.

A method is disclosed for clamping opposing pairs of stator coil windings of a turbine generator. A threaded rod is inserted through a space formed between a pair of coil windings and through a threaded through-hole of a connecting insert member that is received within a bore of a retaining platform positioned adjacent one side and across the pair of coil windings. This threaded rod is tightened hydraulically within the threaded through-hole for biasing the retaining platform against a pair of coil windings.

BRIEF DESCRIPTION OF THE DRAWINGS

Other objects, features and advantages of the present invention will become apparent from the detailed description of the invention which follows, when considered in light of the accompanying drawings in which:

FIG. 1 illustrates a perspective view of a power generator winding showing a stator and stator coils.

FIG. 2 is a perspective view of the clamping apparatus of the present invention shown as clamping the stator coil windings within a turbine generator, such as the type shown in FIG. 1.

FIG. 3 is an exploded, isometric view of a connecting insert member, threaded rod and a portion of a retaining platform.

FIG. 4 is a perspective view of the top portion of the retaining platform and showing a portion cut away to view the threaded rod that mates with the threaded through-hole of the connecting insert member.

DETAILED DESCRIPTION OF PREFERRED EMBODIMENTS

Figure 5:
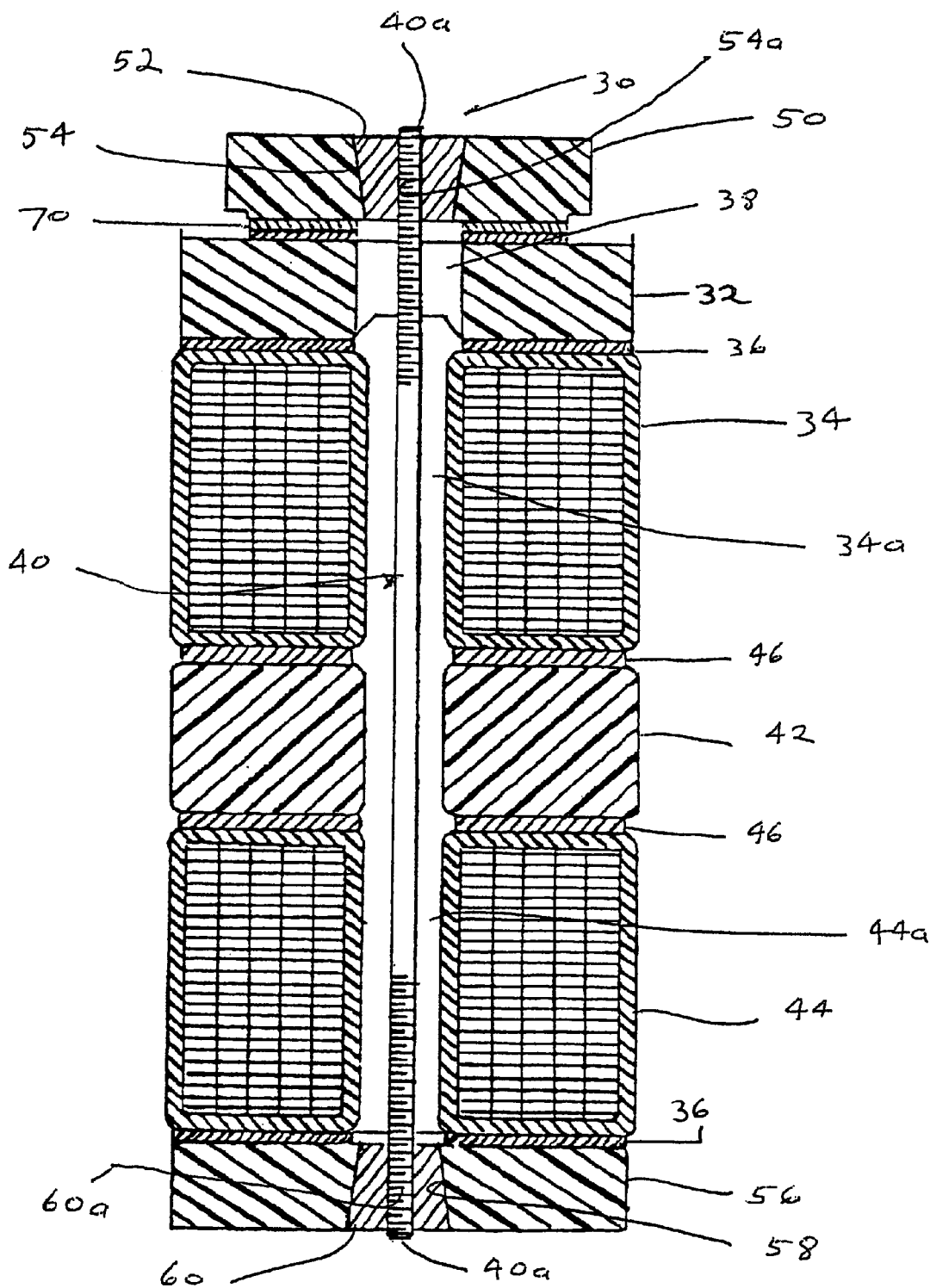
FIG. 5 is a sectional view of the clamping apparatus and the opposing pairs of stator coil windings taken along line 2—2 of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 illustrates a stator end winding 10 having a radial winding clamp 30 used as a clamping apparatus of the present invention. As illustrated, the stator end winding 10 could be part of a power generator (not shown) that includes stator core 14 formed of stator coil windings 16 (also referred to as stator coils) (FIG. 2). The coils are disposed within slots 17 of the stator core 14.

FIG. 1 illustrates a hydrogen-cooled stator winding bracing of the type where the clamping apparatus of the present invention can be used. The radial winding clamp 30 used as a clamping apparatus reduces radial vibration of the individual coil end turns relative to each other, to the strain blocks. The coils are typically insulated and as the top and bottom coils provide improved properties where the end turned portions of the coils are pressed during curing to minimize insulation creep in this area and glasse-poxy layers can be applied, providing a foundation for bracing.

Referring now to FIGS. 2 and 5, there is illustrated in detail the clamping apparatus 30 used for clamping opposing pairs of stator coil windings 16 such as used in the end winding 10 of the type shown in FIG. 1. The clamping apparatus can also be used for other clamping applications, as suggested by those skilled in the art.

As shown in FIGS. 2 and 5, the stator coils 16 are secured by the clamping apparatus 30 of the present invention. It should be understood that throughout this description, the use of the terms such as upper, lower, top, bottom and the like, by way of example, are relative terms and the structures and methods of the present invention are not limited by the convenient use of such relative terms.

The illustrated embodiment of the clamping apparatus 30 shown in FIG. 5 includes a top support block 32, which is positioned radially outside a respective pair of top coils 34. Although bottom support blocks (not shown) could be used, they are not required as the prior art applications typically require. This top support block 32 is spaced from an adjacent top coil 34 by a layer of conformable material 36, such as resin treated polyester felt or other similar materials known by those skilled in the art. When downward pressure is exerted, the top support block 32 compresses the top coil in an operating position. More particularly, the top support block 32 includes an aperture 38 that is adapted to receive a threaded rod 40, in accordance with the present invention, to secure the stator coils 34 in an operating position. Preferably, the aperture 38 is substantially radially aligned in relation to the axis of the overall machine forming the generator. This support block 32 is made of materials that are non-conducting and non-magnetic.

Strain blocks 42 can also be positioned at various locations to provide support between the top stator coils 34 and bottom coils 44. The use of strain blocks 42 is well known to those having ordinary skill in the art. The strain blocks 42 are separated from the top and bottom coils 34,44 by a layer of conformable material 46, such as used between the top support block 32 and the top coil 34, including a material such as resin treated felt or other materials known to those skilled in the art.

As illustrated, a first retaining platform 50 (also referred to as top or upper retaining platform) is positioned adjacent one side and across a first pair of coil windings forming the top coil stator coil windings 34 having a space 34a therebetween, and in one aspect of the present invention, is positioned against the top support block 32. The first retaining platform 50 has a bore 52 extending therethrough that is aligned with the space 34a between the first pair of coil windings. The first retaining platform 50 defines the bore 52, which has a substantially tapered cross-section as illustrated for receiving a first connecting insert member 54, as described below.

A second retaining platform 56 (also referred to as bottom or lower retaining platform) is positioned adjacent one side and across the second pair of stator coil windings 44, which have a formed space 44a therebetween. The second retaining platform 56 has a bore 58 extending therethrough for aligning with the space 44a of the second pair of coil windings. A second connecting insert member 60 is received within the bore 58. Thus, the first and second pairs of coil windings 34,44 are sandwiched between first and second retaining platforms 50,56. It is also seen that the first or top pair of stator coil windings 34 are positioned parallel in a spaced relation and form the space 34a therebetween, and the second or bottom pair of stator coil windings 44 are positioned parallel and in spaced relation, thus forming a space 44a therebetween. The second pair of stator coil windings 44 oppose the first pair of stator coil windings with alignment of the spaces 34a, 44a therebetween and having the strain block 42 separating the first and second pairs of stator coil windings. The bores 52,58 in each of the first and second retaining platforms 50,56 is tapered in cross-section and receives the respective first and second connecting insert members 54,60. Each of the first and second connecting insert members 54,60 has a threaded through-hole 54a, 60a that is aligned with the formed space in the first and second pairs of coil windings and in the strain block and top support block.

The threaded rod 40 passes through each of the spaces 34a, 44a of the first and second pairs of coil windings 34,44 and passes through the threaded through-holes 54a, 60a of the connecting insert members 54, 60. The threaded rod 40 mate with each threaded through-hole 54a, 60a such that tension is created in the threaded rod 40 during tightening. The threaded rod 40 biases the retaining platforms 50, 56 against the pairs of coil windings as the rod is tightened.

As shown in FIGS. 3 and 4, in one preferred aspect of the invention, each connecting insert member 54, 60 is formed as separable mating segments 54b 60b to allow easy insertion within each bore 52, 58 extending through the first and second retaining platforms 50, 56. This type of design is advantageous when the threaded rod 40 is formed of a material such that the strength of the threads on the threaded rod are increased with increased tension. For example, the threaded rod 40 could be formed of resin treated fiberglass or other plastic or similar material, where, as the tension is increased on the threaded rod, the strength of the threads is increased. The tapered angle of the bore within each retaining platform and on the outside surface of the first and second connecting insert members also provides for forces of compression onto the threads and allows an additional force for locking the clamp via the threads and increasing the strength of the material because of pressure from the tapered surfaces.

As known to those skilled in the art, resin treated felt 36 is inserted between the second retaining platform 56 and second pair of stator coil windings 44, and the first retaining platform 50, and in the particular embodiment shown, the top support block 32. During the insertion process, the first (top) retaining platform 50 is lifted along a lifting edge 71 formed by the groove as shown in FIG. 2 by a hydraulic mechanism that stretches the threaded rod. Thus, the threaded rod, such as formed from fiberglass, has retained tension because it is stretched. The shims are then inserted and keep the threaded rod stretched. The shims make up the space, such that when the tension is released, a force is exerted on the coils with the retained tension. During insertion, as much as 5,000 pounds of force is inserted downward, compressing top and bottom coils. During application, either less or more pressure could be applied, depending on circumstances.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A clamping apparatus useful for clamping opposing pair of stator coil windings of a turbine generator, the clamping apparatus comprising:

a retaining platform positioned adjacent one side and across a pair of coil windings having a space therebetween and having a bore extending therethrough that is aligned with the space between the pair of coil windings;

a connecting insert member carried within the bore of the retaining platform and having a threaded through-hole aligned with the space between the pair of coil windings; and a threaded rod extending through the space between the pair of coil windings and through the threaded through-hole of the connecting insert member, wherein said threaded rod mates with the threaded through-hole such that the tension created in the threaded rod during tightening biases the retaining platform against the pair of coil windings.

2. A clamping apparatus according to claim 1, wherein the threaded rod is used with shims for increasing or decreasing tension within the threaded rod and increasing or decreasing biasing of the retaining platform against the pair of coil windings.

3. A clamping apparatus according to claim 2, wherein said threaded rod is formed of a material wherein the strength of the threads on the threaded rod is increased with increased tension.

4. A clamping apparatus according to claim 3, wherein said threaded rod is formed of fiberglass and resin.

5. A clamping apparatus according to claim 1, wherein said connecting insert member has a tapered cross-section adjustably secured within said bore of said retaining platform.

6. A clamping apparatus according to claim 1, and further comprising a support block for positioning between the retaining platform and across the pair of coil windings, said support block having an aperture therethrough for aligning with the space between the pair of coil windings and the bore of said retaining platform.

7. A clamping apparatus according to claim 1, wherein said connecting insert member comprises separable mating segments.

8. A clamping apparatus according to claim 7, wherein the separable mating segments comprise mating arcuate portions forming the through-hole.

9. A clamping apparatus according to claim 1, wherein said pair of coil windings are positioned parallel and in a spaced relation, thus having a space therebetween.

10. A clamping apparatus useful for clamping opposing pairs of stator coil windings of a turbine generator, the clamping apparatus comprising:

a first retaining platform positioned adjacent one side and across a first pair of coil windings having a space therebetween, said first retaining platform having a bore extending therethrough that is aligned with the space between the first pair of coil windings;

a second retaining platform positioned adjacent one side and across a second pair of coil windings having a space therebetween, said second retaining platform having a bore extending therethrough for aligning with the space of the second pair of coil windings, wherein the first and second pairs of coil windings are sandwiched between said first and second retaining platforms;

first and second connecting insert members, each respectively carried within each bore of said retaining platforms, each of said connecting insert portions having a threaded through-hole; and a threaded rod passing through each of the spaces of each of the first and second pairs of coil windings and passing through the through-holes of the connecting insert members, wherein said threaded rod mates with each threaded through-hole such that the tension created in the threaded rod during tightening biases the retaining platforms against the pairs of coil windings.

11. A clamping apparatus according to claim 10, wherein the threaded rod is used with shims for increasing or decreasing tension within the threaded rod and increasing or decreasing biasing of the retaining platforms against the pairs of coil windings.

12. A clamping apparatus according to claim 10, wherein said threaded rod is formed of a material such that the strength of the threads on the threaded rod is increased with increased tension.

13. A clamping apparatus according to claim 12, wherein said threaded rod is formed of fiberglass and resin.

14. A clamping apparatus according to claim 10, wherein said connecting insert member has a tapered cross-section adjustably secured within said bore of said retaining platform.

15. A clamping apparatus according to claim 10, and further comprising a support block for positioning between the retaining platform and across the pair of coil windings, said support block having an aperture therethrough for aligning with the space between the pair of coil windings and the bore of said retaining platform.

16. A clamping apparatus according to claim 10, wherein said connecting insert member comprises separable mating segments.

17. A clamping apparatus according to claim 16, wherein the separable mating segments comprise mating arcuate portions forming the through-hole.

18. A clamping apparatus according to claim 10, wherein said first pair of coil windings are positioned parallel and in a spaced relation, thus having a space therebetween.

19. A clamping apparatus according to claim 10, wherein said second pair of coil windings are positioned parallel and in spaced relation, thus having a space therebetween, said second pair of coil windings opposing said first pair of coil windings with alignment of the spaces therebetween.

20. A method for clamping opposing pair of stator coil windings of a turbine generator comprising the steps of:

inserting a threaded rod through a space formed between a pair of coil windings and through a threaded through-hole of a connecting insert member that is received within a bore of a retaining platform positioned adjacent one side and across the pair of coil windings; and tightening the threaded rod within the threaded through-hole for biasing the retaining platform against the pair of coil windings with shims.

21. A method according to claim 20, and further comprising the step of compressing the threads on the threaded rod by increasing the tension.

* * * * *